United States Patent [19]

Seegopaul et al.

[11] Patent Number: 5,613,998
[45] Date of Patent: Mar. 25, 1997

[54] RECLAMATION PROCESS FOR TUNGSTEN CARBIDE AND TUNGSTEN-BASED MATERIALS

[75] Inventors: Purnesh Seegopaul, Flemington; Li Wu, Plainsborough, both of N.J.

[73] Assignee: Nanodyne Incorporated, Brunswick, N.J.

[21] Appl. No.: 447,383

[22] Filed: May 23, 1995

[51] Int. Cl.$^6$ ........................................................ C22B 7/00
[52] U.S. Cl. ................................ 75/419; 75/743; 423/440
[58] Field of Search ............................... 423/440; 75/419, 75/743

[56] References Cited

U.S. PATENT DOCUMENTS

| | | | |
|---|---|---|---|
| 3,953,194 | 4/1976 | Hartline, III et al. | 423/440 |
| 4,851,041 | 7/1989 | Polizzotti et al. | 75/240 |
| 5,230,729 | 7/1993 | McCandlish et al. | 75/351 |
| 5,352,269 | 10/1994 | McCandlish et al. | 75/351 |
| 5,417,945 | 5/1995 | Gingerich et al. | 423/56 |

*Primary Examiner*—Melvyn Andrews
*Attorney, Agent, or Firm*—Wood, Herron & Evans, P.L.L.

[57] ABSTRACT

Tungsten carbide and/or tungsten can be recycled by oxidizing the tungsten composition at a temperature greater than 700° C. to form a water insoluble tungsten trioxide. This is then reduced to form tungsten dioxide. The tungsten dioxide is subjected to a low temperature oxidation which forms monoclinic tungsten trioxide. The monoclinic tungsten trioxide is then dissolved in ammonia to form ammonium tungstate. If present, the binder metal such as cobalt is converted into the soluble ammine complex. This can be spray dried and carburized to form tungsten carbide. If the form composition includes cobalt or other binder metal, the ratio of cobalt to tungsten can be adjusted by adding cobalt salts or ammonium metatungstate to the aqueous solution prior to spray drying to form a precursor composition. This is uniquely suitable for forming a cobalt tungsten carbide composition.

12 Claims, No Drawings

RECLAMATION PROCESS FOR TUNGSTEN CARBIDE AND TUNGSTEN-BASED MATERIALS

BACKGROUND OF THE INVENTION

Tungsten carbide is widely used today with a wide application range that includes cutting tools, mining tools and wear parts. The material can be produced by a variety of different manufacturing processes. Several preferred methods of forming grains of tungsten carbide embedded in a cobalt matrix are disclosed in Polizotti U.S. Pat. No. 4,851,041, as well as McCandlish U.S. Pat. Nos. 5,230,729 and 5,352,269.

Tungsten and tungsten carbide products are relatively expensive, and there is an extreme need to recover scrap by recycling spent and unused tungsten carbide and tungsten-based products, both for environmental and cost reasons.

There are several processes currently used to recycle tungsten carbide and tungsten products. These processes include the zinc process, the coldstream process, an alkali-leach process, chlorination systems, electrolysis, and high-temperature smelting. With the exception of the zinc and coldstream processes, the other chemical methods involve numerous conversion, extraction and precipitation steps that increase the cycle time and cost. Many of these chemical methods involve the use of acids, bases, and various inorganic salts.

The zinc and cold stream processes do permit a direct conversion into usable powder, but material purity is a problem, and thus the application for this type of reclaimed material is extremely limited. Typically, the more common zinc process involves heating, sublimation, and crushing processes to recover WC-Co powder. A key difference is that the zinc process leaves the grain size intact, causing successive grain growth on each cycle.

SUMMARY OF THE INVENTION

The present invention is premised on the realization that tungsten and tungsten carbide materials can be reclaimed relatively inexpensively. According to the present invention, tungsten carbide scrap, tungsten and tungsten-containing materials scrap are oxidized to form tetragonal and octahedral tungsten trioxide which is insoluble in water and ammonia solutions. This is subsequently reduced with hydrogen to form tungsten dioxide, which is, in turn, reoxidized at a lower temperature to form the monoclinic tungsten trioxide. This can then be dissolved in ammonia-based solution to form ammonium tungstate, which then can be spray dried to form a precursor composition for further carburization and the formation of tungsten carbide. The cobalt present is transformed from the metallic specie to a tungstate form, and then finally into an ammine-type complex which is soluble in the ammonia solution. This cobalt is then available to form the WC-Co composite material. The objects and advantages of the present invention will be further appreciated in light of the following description.

DETAILED DESCRIPTION

In the present invention, tungsten-containing materials are recycled to form a precursor composition suitable for formation of tungsten carbide and other composite materials. The tungsten material which can be used in the present invention includes elemental tungsten, tungsten carbide, tungsten oxides, tungsten-copper, tungsten-silver, tungsten nitride, tungsten boride, tungsten selenide, tungsten sulfide, tungsten silicide and tungsten carbide with a binder such as cobalt, nickel or iron.

This material will generally be waste material and is referred to in the industry as "hard scrap" or "soft scrap." Hard scrap would be previously sintered material, and soft scrap would be unsintered powder. With respect to hard scrap, this should be crushed to a small size suitable for loading into a rotary furnace. While it is preferred that the crushed size be down to a few millimeters to increase the reaction rate, fragments in the range of 1 to 2 centimeters can also be utilized.

According to the present invention, the tungsten-containing material or scrap is initially oxidized at a temperature range of 800° C. to 1200° C. This is accomplished by simply heating the tungsten material in an oxidizing atmosphere such as air or oxygen for a period of a few hours. Steam or mixtures with steam can also be used for this purpose.

This reaction will then form the tetragonal/octahedral tungsten trioxide which is known to be insoluble in water or ammonia solutions. In addition, if binder elements such as cobalt are present, a metal tungstate composition is formed (e.g., $CoWO_4$). This tungsten salt is not separated from the trioxide and is further converted as the reaction conditions change.

The product of the initial oxidation is then subjected to a hydrogen reduction. The reduction is conducted at 600° C. to 90° C. Other reducing gases can be used in lieu of hydrogen, such as mixed hydrogen-containing gases which have a relatively low carbon activity, i.e., less than 0.1. Preferably, the reduction will be at about 900° C. for about four hours. This is continued until tungsten dioxide is formed. Any binder metal present as the tungstate will remain as tungstate in the reaction mixture. A small percent may be converted to oxides or metal-metal species and these oxides/species are Simply removed in an on-line filtration in the solution preparation stage for spray drying. Additionally, chelation/complexation reaction chemistry can be employed. For example, EDTA can be added to remove dissolved species as well as dissolved cobalt, vanadium or chromium if desired.

The product of the reduction, i.e., tungsten dioxide, and any binder is then subjected to a low temperature oxidation. The low temperature oxidation transforms the tungsten dioxide to monoclinic tungsten trioxide. This should be conducted at greater than about 250° C. and less than 600° C., which will favor the formation of the monoclinic tungsten trioxide. It is also possible that a small concentration of soluble tungsten-based tungstate salts may be formed.

The low temperature oxidation is conducted by simply heating the reaction mixture to the oxidation temperature in an oxidizing atmosphere such as air. Steam and steam mixtures can also be employed, as well as oxygen. But for economics, it is preferred to simply conduct the oxidation using ambient air.

These three conversion steps comprised of high temperature oxidation, reduction, and then low temperature oxidation, may be conducted in the same reaction chamber without any need to change equipment or transfer product in these reaction sequences. Of course, product can be transferred, if desired. This then reduces the number of steps and powder handling operations, thereby reducing costs, cycle time and contamination.

The formed product, which is primarily monoclinic tungsten trioxide along with any binder salt that may be present, is simply dissolved in a basic aqueous solution. Preferably, the aqueous solution will be an ammonium solution, and in this embodiment an excess of ammonia is employed. The dissolution can be accomplished by simply adding the monoclinic tungsten trioxide product to water and bubbling ammonia into the water until the tungsten trioxide dissolves. Unused ammonia can be recaptured and reused via a gas recycling system. In this manner, the tungsten trioxide is converted into ammonium tungstate while binder elements will form soluble ammine complexes. Any undissolved species are simply removed by an on-line filtration system in a closed-loop arrangement. These undissolved species can include carbides of chromium, titanium, tantalum and vanadium which are used as grain growth inhibitors.

Upon dissolution, the concentration of tungsten and binder elements can be measured by any appropriate analytical method, such as atomic absorption and emission spectroscopic (ICP) techniques. If desired, the ratio of binder metal to tungsten can then be adjusted by adding either a water-soluble binder salt such as cobalt nitrate or ammonium metatungstate to the solution. This solution can then be spray dried to form a precursor powder which is suitable for formation of tungsten carbide by subjecting it to elevated temperatures in the presence of a carburizing gas, as is now well known in the industry. The present invention will be further appreciated in light of the following detailed example.

EXAMPLE 20 g of solid WC-15% Co chunks were ground to a partial size of a few mm and oxidized at 1000° C. for 300 minutes in a static bed with air as the oxidizing medium. The product was reduced to $WO_2$ at 850° C. with hydrogen over a period of 120 minutes by changing the gas from air to hydrogen. Without any powder removal or handling, this product was then oxidized at 350° C. to monoclinic $WO_3$ over a period of 8 hours. Co is present as cobalt tungstate. The powder was then dissolved in water with bubbling ammonia for a few hours (at temperatures of<100° C.). Analysis by ICP showed that 87% of the starting WC-15% Co went into solution.

Thus, the present invention provides an extremely simple method of recycling carbide and tungsten waste products. This can then be used with or without Co or other binder metals typically associated with tungsten carbide. Further, because the process employs only oxygen, ammonia and water, the end product is very pure and suitable for immediate use for formation of tungsten carbide without further processing.

This has been a description of the present invention along with a preferred method of practicing the present invention, however, the invention itself should only be defined by the appended claims wherein

We claim:
1. A method of recycling a tungsten composition comprising heating said tungsten composition at a temperature in excess of 700° C. in an oxidizing atmosphere to form a tetragonal/octahedral tungsten trioxide;

reducing said tetragonal tungsten trioxide by heating said tungsten trioxide in the presence of a reducing gas at a temperature of from 600° to 900° C. to form tungsten dioxide;

oxidizing said tungsten dioxide by heating said tungsten dioxide at a temperature of less than 600° C. in an oxidizing atmosphere to form monoclinic tungsten trioxide and dissolving said monoclinic tungsten trioxide in an aqueous basic solution.

2. The method claimed in claim 1 wherein said tungsten composition is selected from the group consisting of tungsten, tungsten carbide, tungsten oxide, tungsten-silver, tungsten-copper and tungsten carbide binder complex.

3. The method claimed in claim 1 wherein said aqueous basic solution is an aqueous solution of ammonia and wherein ammonia metatungstate is formed.

4. The method claimed in claim 2 wherein said low temperature oxidation is conducted at a temperature of less than about 350° C.

5. The method claimed in claim 1 wherein said high temperature oxidation is conducted at from 850° to 1200° C. in the presence of oxygen.

6. The method claimed in claim 1 wherein said tungsten trioxide is reduced at 600° to 900° C. in the presence of a reducing gas selected from hydrogen and a mixture of hydrogen and methane.

7. The method claimed in claim 1 wherein said tungsten composition further includes cobalt, and wherein said high temperature oxidation forms a cobalt tungstate, and wherein said cobalt tungstate is dissolved in an aqueous solution of ammonium to form cobalt amine.

8. The method claimed in claim 1 further including adding chelating agents to said aqueous basic solution to selectively complex metallic species.

9. The method claimed in claim 2 wherein said tungsten carbide binder complex includes a carrier metal selected from the group consisting of nickel, cobalt and iron.

10. The method claimed in claim 9 further comprising adding a soluble salt of said carrier metal to said aqueous basic solution to establish a desired rate of carrier metal to tungsten and spray drying and carburizing said aqueous solution to form a carrier metal tungsten carbide matrix.

11. The method claimed in claim 9, further comprising dissolving additional soluble salt of tungsten in said aqueous alkaline solution to establish a desired ratio of carrier metal to tungsten and spray drying and carburizing said aqueous solution to form a carrier metal tungsten carbide matrix.

12. The method claimed in claim 1 further including filtering said aqueous solution of ammonia.

\* \* \* \* \*